INVENTOR
John P. Holland Jr.
BY Boyken & Mohler
ATTORNEYS

Aug. 4, 1942.　　J. P. HOLLAND, JR　　2,291,716
EXCAVATING ELEVATOR
Filed Dec. 5, 1939　　4 Sheets-Sheet 2
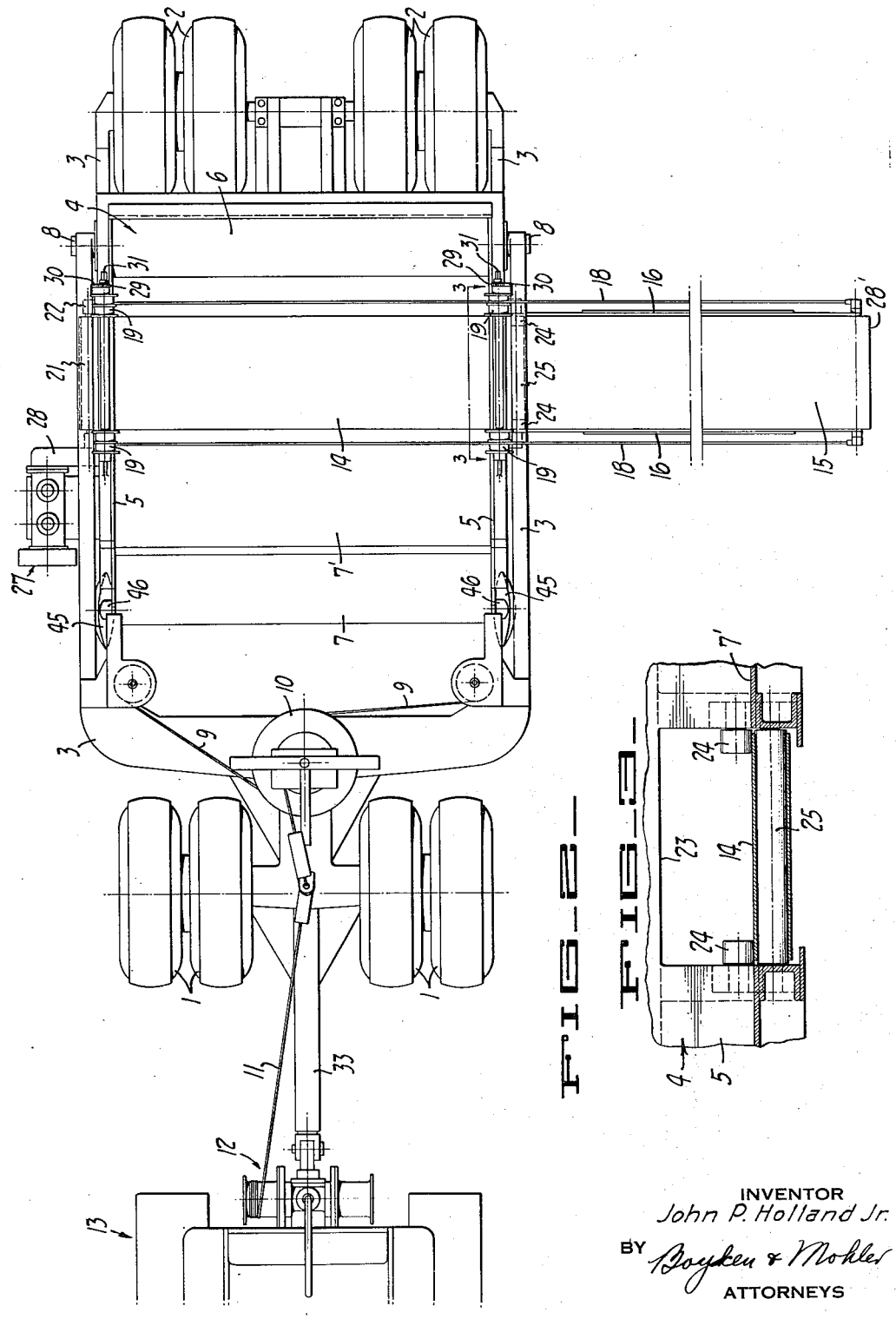
INVENTOR
John P. Holland Jr.
BY Boyken & Mohler
ATTORNEYS

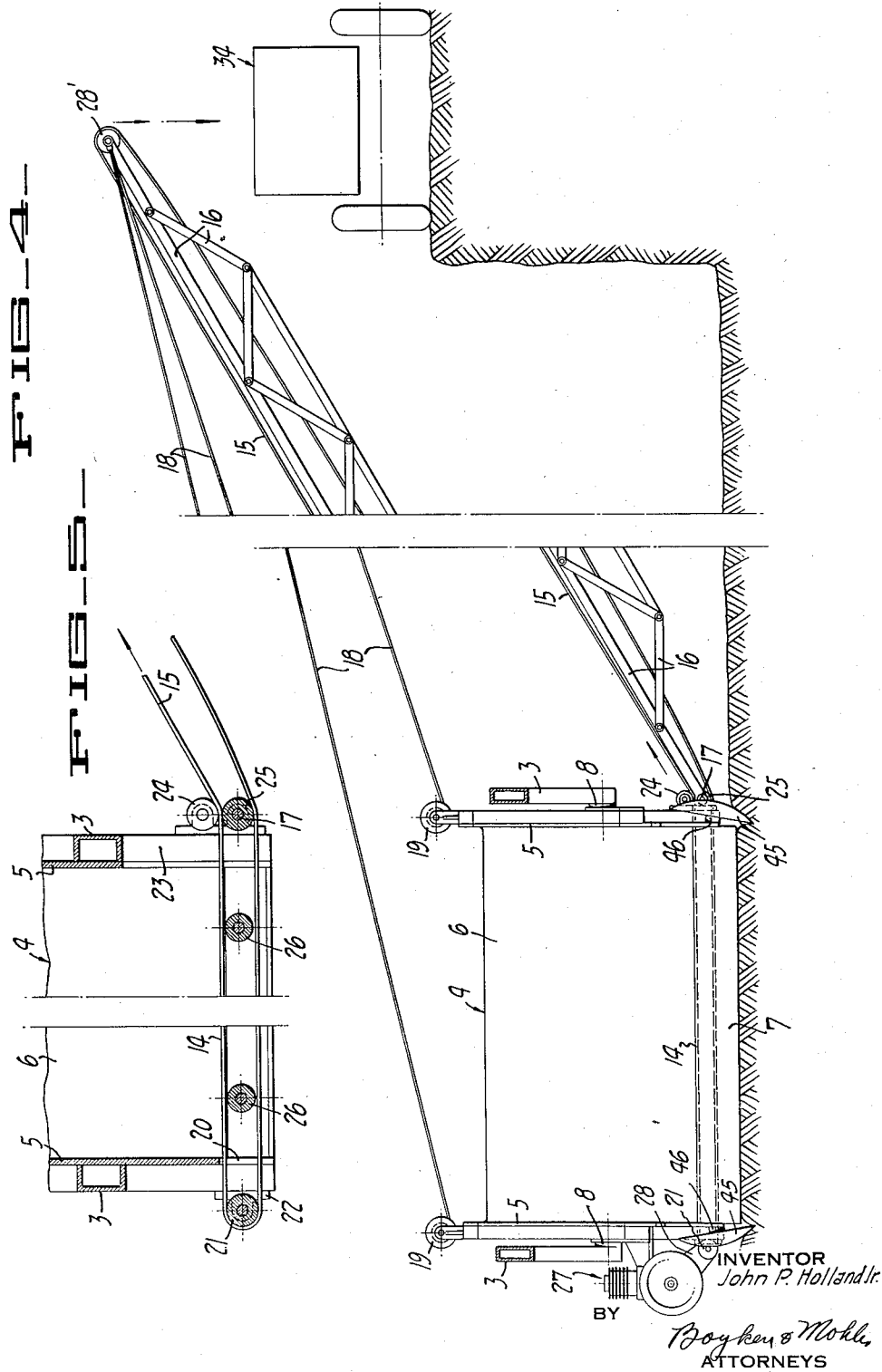

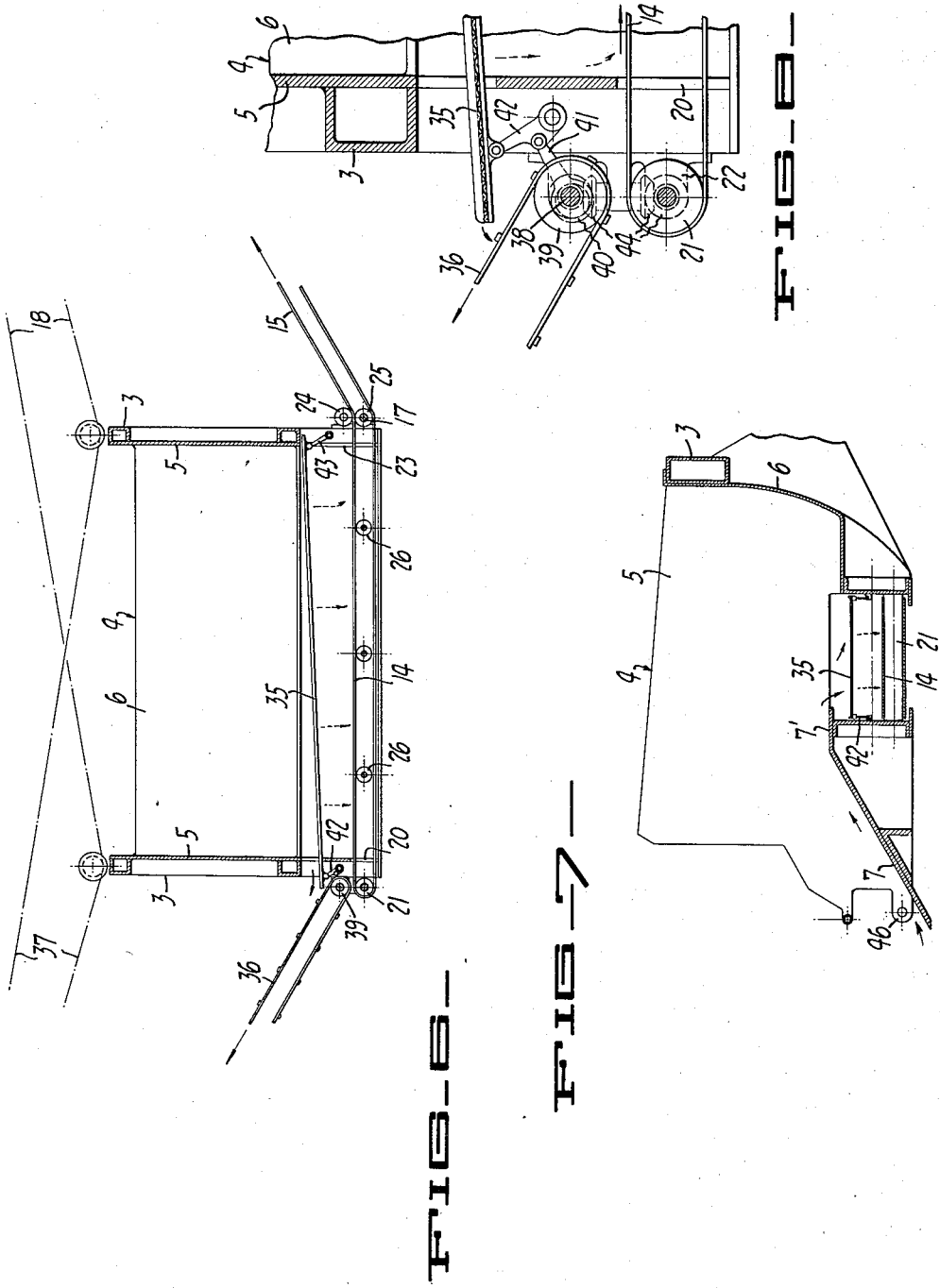

Patented Aug. 4, 1942

2,291,716

UNITED STATES PATENT OFFICE 2,291,716

EXCAVATING ELEVATOR

John P. Holland, Jr., San Francisco, Calif.

Application December 5, 1939, Serial No. 307,630

3 Claims. (Cl. 262—2)

This invention relates to a portable excavating elevator and has for one of its objects an improved earth handling apparatus adapted to be moved over the ground and to transfer earth, or other material on or off the ground to a remote point for discharge at said point, during said movement, more efficiently than heretofore.

Another object is improved apparatus of the above nature that is adapted to pick up and transfer earth during its movement over the ground, without requiring the ground to be prepared for picking up of the earth and the transfer thereof.

Another object is improved earth handling apparatus adapted to excavate, cut, dig, or pick up earth or material on the ground in a manner similar to that of a conventional scraper or earth mover having a relatively long cutting blade in advance of the bowl, but which earth or material, after being picked up and passing across the cutting blade, is immediately carried away by an elevator to a point of discharge where the earth is adapted to be discharged into a carrier, such as a truck, or to one side of the path of travel of the apparatus.

A still further object is improved earth handling apparatus adapted to be moved over the ground and to pick up and classify earth or material so picked up, according to size, and to convey the classified material, according to the classification, along separate paths of travel to separate discharge points for discharge from said points.

Other objects and advantages will appear in the drawings and description annexed hereto.

In the drawings, Fig. 1 is a side elevational view of one form of my invention, the ground being shown in section, and a fragment of the pulling tractor being indicated.

Fig. 2 is a plan view of Fig. 1, with the elevator broken in length to fit the sheet.

Fig. 3 is a sectional view along line 3—3 of Fig. 2.

Fig. 4 is a front elevational view of the invention showing the side frame members on the scraper in section and with the forward wheels and bowl or scraper lifting mechanism omitted.

Fig. 5 is an enlarged fragmentary sectional view showing lower end of the elevator in elevation and the scraper bowl and some of the elevators rollers in section.

Fig. 6 is a semi-diagrammatic sectional view showing my invention with a classifier in position in the scraper element.

Fig. 7 is a sectional view through the scraper bowl and my elevator and classifier taken at right angles to the view of Fig. 6.

Fig. 8 is an enlarged fragmentary sectional view showing the classifier actuating mechanism and a portion of the lower end of one of the elevators in elevation.

Figure 1:
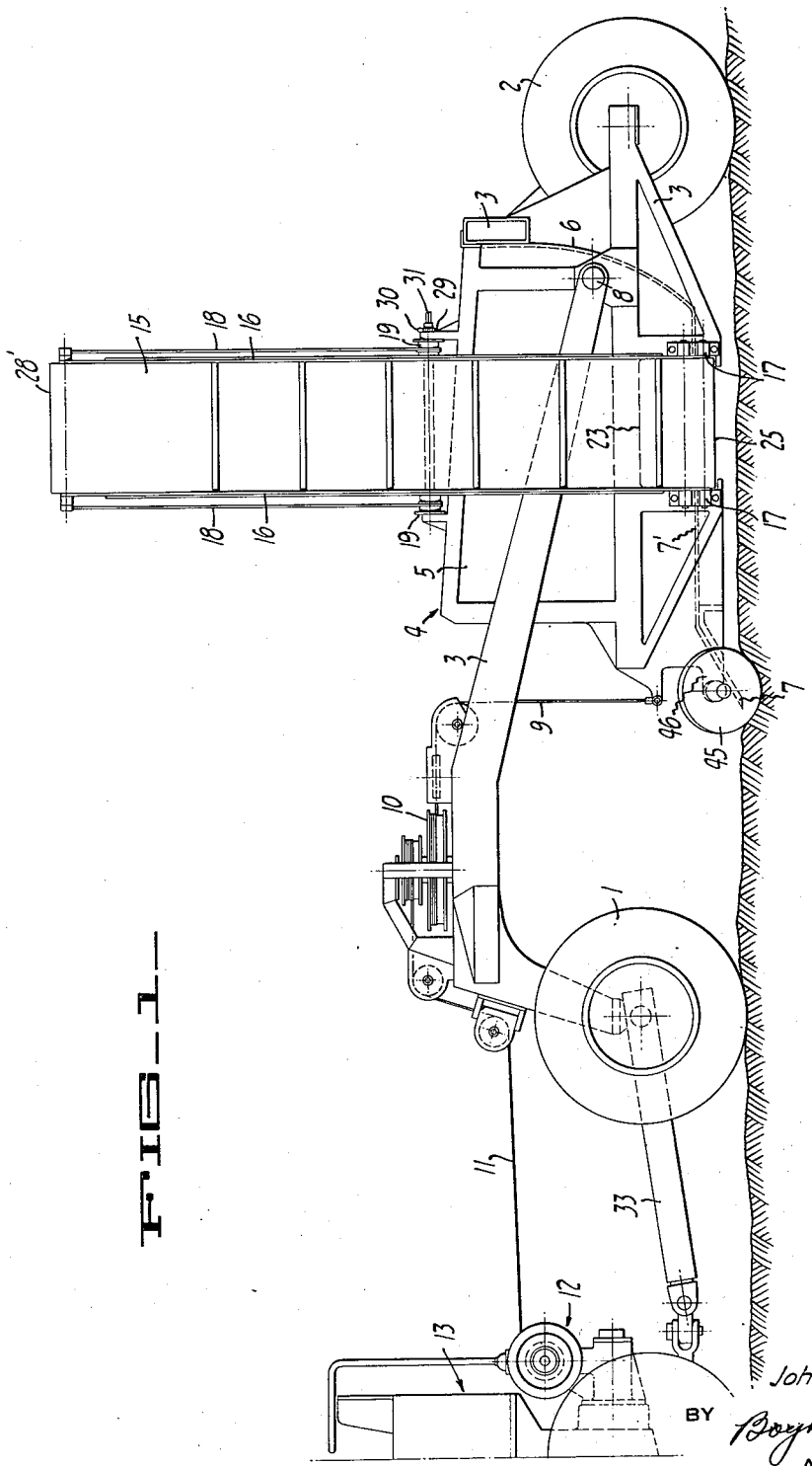

Briefly described, heretofore where it has been necessary to prepare land for roads, dams, buildings, etc., a large number of scrapers or earth movers were used. The earth is excavated by the scrapers until they are loaded after which the scrapers with their loads are moved to a discharge point where the earth is dumped and then the scrapers are drawn back to the area being excavated for repeating the process. Ordinarily each of these scrapers is drawn by a relatively slow moving tractor, and many times the distance the earth is carried before dumping thereof is appreciable. This phase of the construction work is costly, since each scraper requires a tractor and the scrapers and tractors are idle insofar as the excavating operation is concerned during the haul to the dumping point and the return trip. My invention is to supplant the usual scrapers, particularly where the excavated earth must be hauled a relatively long distance for dumping. This is accomplished by excavating the earth by an excavator having at least the same excavating capacity of a conventional scraper, and providing an elevator to receive the earth so excavated, which elevator is adapted to discharge the earth into a truck moving alongside the excavator at the same rate of speed as the excavator. As soon as the truck is loaded it rapidly carries the earth to a dumping point while another truck takes its place by the excavator. In this manner the excavator is continuously picking up the earth as it moves along, and discharging it into a truck, that carries the earth to the dumping point.

Of course, in many instances the earth excavated by my excavator may be dumped onto the ground alongside the path of travel of the excavator, and the excavator may be used to pick up gravel, sand, or the like while being moved along, its use not being necessarily limited to the actual excavating of earth from the ground. Also, in some instances, where the soil is rocky, I provide means for classifying the material picked up before discharge thereof, which provision is desirable, particularly in dam construction and sometimes in road work.

The apparatus shown in the drawings comprises front ground wheels 1 and rear ground wheels 2 supporting frame work 3 on which is carried scraper bowl 4. Bowl 4 has sides 5, rear end 6, an open front end and a cutting blade 7 extending between sides 5 adjacent their forward lower edges. Pivots 8 at the sides of the bowl pivotally connect bowl supporting frame members that are respectively carried by the front and rear wheels for lowering and raising the cutting blade 7 into and out of the ground. The means for so lowering and raising the blade comprises cables 9 connecting between the forward end of the bowl 4 and a drum 10, which drum in turn is operatively connected by a cable 11 with a power driven winch drum 12 on the scraper pulling tractor 13 for operation by conventional power means on the tractor.

The construction described above is substantially standard in scraper bowls of the earth carrying type, practically all of which are wheel mounted with means for lowering the cutting blade of the bowl for digging into the ground and for raising the blade clear of the ground for carrying the earth to a remote point for dumping, which dumping operation may be accomplished by various structural arrangements not important to the present invention.

Insofar as this invention is concerned, instead of the scraper bottom being stationary during the digging movement of blade 7, the said bottom comprises one end portion 14 of a belt conveyor, which end portion is horizontal and extends transversely of the direction of travel of the bowl from one of the sides 5 to the side opposite thereto, and at about the plane of said latter side the remaining portion 15 of the conveyor, which forms the elevator, extends slantingly upwardly at the desired angle for carrying earth or other material deposited on portion 14 to an elevated point of discharge at the upper end of portion 15 (Fig. 4). Frame members 16 partially connected at 17 to the bowl frame 3 at the lower opposite sides of the bowl extend upwardly to the outer end of portion 15 for supporting the portion 15 in elevated positions and suitable cables 18 may connect between winding drums 19 on the bowl frame at the upper sides of the bowl and upper outer ends of members 16 for holding the members 16 in their proper inclined positions and for raising and lowering the portion 15 and members 16.

The portion 14 of the belt conveyor passes at its closed end through opening 20 formed in the lower margin of one of the sides 5 of the bowl and over a roller 21 suitably supported in bearings 22 positioned outwardly of said side, while the end of portion 14 connecting with inclined portion 15 passes through the lower end of a relatively large opening 23 formed in the other side 5 of the bowl. At the juncture of portions 14 and 15 the upper run of the conveyor belt passes under guide rollers 24 below which is roller 25 that extends across the width of the belt. Other idler rollers 26 may be positioned between rollers 21 and 25 at spaced points to support the upper run of portion 14 level.

The blade 7 may be separately bolted to a portion of the bottom of the bowl or said blade may extend rearwardly any desired distance, thus may be of a width to virtually form a portion 7' of the bottom of the bowl 4 (Fig. 1), the said portion, whether formed integrally with or separable from the bowl, terminates at its rear edge close to the forward edge of the upper run of portion 14, and at a plane no lower than the plane of said upper run, whereby the material passing over blade 7 and portion 7' will be deposited onto the said upper run.

The rear end 6 of the bowl 4 terminates at its lower end adjacent the edge of the upper run of portion 14 that is opposite the cutting blade, and as the lower edge of opening 20 is close to the conveyor belt, it will be seen that the material cannot pile up in said bowl but will be carried by the conveyor through opening 23 and upwardly on portion 15 for discharge from the upper end of the conveyor.

The conveyor is preferably actuated for so carrying the material out of the bowl by power means, such as a motor 27 (Figs. 2 and 4) having a suitable driving connection 28 with roller 21. It is obvious, of course, that the conveyor 14 may be a slat conveyor, belt conveyor or any other conventional type of conveyor, although a belt conveyor, as indicated, has been found to be satisfactory for most work. Roller 28', over which the outer end of the conveyor portion 15 extends, may be driven by the motor instead of roller 21, is desired and any desired number of conventional idler rollers may be used to support the upper run of portion 15 in the usual manner.

The winding drums or rollers 19 are conventional in that they are provided with ratchets 29 at one end engageable with a pawl 30 carried by the standards mounting the rollers for holding the members 16 and portion 15 in adjusted elevated position, and one end 31 of the drum shaft may be square for engagement in the square socket of a removable winding handle (not shown).

In operation the tractor 13 connected by drawbar 33 with the scraper pulls the scraper over the ground, and upon lowering blade 7 into the surface of the ground, the earth cut by the blade will move thereover and onto the portion 14 of the conveyor and will be carried up portion 15 for discharge over the upper end of the latter portion into truck 34 (Fig. 4) moving alongside the scraper at the speed of the latter. The truck may be on substantially the same surface level of the scraper or at a higher or lower level, since the members 16 may be raised or lowered about pivot 17 to insure the material dropping into the truck. If the particular job of leveling or excavating does not require a truck, as where a bank is to be formed or a fill to be made, the material on portion 15 may merely discharge freely from the outer end of said portion.

In some instances, as where the ground is rocky or where there is a gravel formation, it is desirable that the material excavated be classified, to size, in which case a shaker screen 35 (Figs. 6 to 8) is disposed over the lower, horizontal portion 14 of the conveyor, or elevator, which screen is inclined downwardly from the side of the bowl adjacent portion 15 of the conveyor to discharge coarse material onto the lower end of an upwardly inclined conveyor 36 extending outwardly from the side of the bowl opposite portion 15. The finer material (according to the mesh size of screen 35) falls onto portion 14 and is carried up portion 15 for discharge in the same manner as described for Figs. 1 to 5. Conveyor 36 is, of course, supported in elevated position at the outer end in the same manner as conveyor 15, the elevating and supporting cables 37 that are diagrammatically indicated in Fig. 6 corresponding to cables 18 of Fig. 4 except that they are associated with conveyor 36 instead of conveyor 15.

The drive shaft 38 mounting the roller 39 over which the lower end of conveyor 36 extends (Fig. 8) operates eccentric 40 that is connected by arm 41 and link 42 with the screen 35 for vibrating said screen, and links 43 support the elevated end of screen 35 for vibratory movement of the latter.

In the form of invention illustrated in Figs. 6 to 8, it is noted that the rearward extension of cutting blade 7 terminates above screen 35 while the rear end 6 of the bowl also terminates at its lower end above said screen, so that the material entering the bowl will all pass onto said screen.

Any suitable means may be employed for driving the conveyor 36, such as gears 44 connecting between drive shaft 38 of roller and the drive shaft of roller 21, so that upon driving roller 21 by motor 27 the conveyor 36 will also be actuated.

By driving conveyor (14 and 15) or by driving both conveyor 14 and 15 and conveyor 36 by a source of power on the scraper independently of the tractor 13, it is obvious that the speed of the said conveyors is independent of the speed of movement of the scraper over the ground, and by conventional throttle control means the driver or operator may vary the speed of the conveyors as desired.

Where the soil is relatively soft, the forward edges of the sides 5 of the bowl are suitable for cutting the ground at the ends of blade 7, but in relatively hard soil, I prefer to position rotary disc cutters 45 ahead of said forward edges, which cutters are inclined in the usual manner for cutting the earth at the ends of blade 7. The said cutters 45 are rotatably supported on brackets 46 connected with the sides of the bowl, and are removable, if desired.

It is manifest that the conveyor may be stopped independently of movement of the vehicle mounting the same, in the event it is found desirable to stop the discharge of material from the conveyor, in which event the material engaged by the cutting blade will merely pass onto the lower end 14 of the conveyor for subsequent discharge upon re-starting the conveyor. Also, in such case, the tractor may be stopped and the material accumulated on portion 14 discharged at one point, if desired, or the tractor and conveyor may be operated simultaneously in the usual manner.

Having described my invention, I claim:

1. A device of the character described comprising a wheel mounted vehicle adapted for movement over the ground in one direction, an elongated, generally horizontally extending cutting blade on said vehicle extending transversely of the directional movement thereof and positioned for engaging the ground during said movement, a classifier positioned to receive material passing over said blade substantially directly therefrom for classifying said material as to size, a pair of conveyors extending outwardly of said vehicle, respectively positioned relative to said classifier for receiving differently classified material therefrom, means actuating said conveyors for carrying the classified material from said classifier outwardly and upwardly of the vehicle and laterally outwardly of the path of movement of said cutting blade during movement of the vehicle in said direction for discharge over the elevated ends thereof at points spaced from the vehicle, means for actuating said classifier, means for actuating said conveyors and means for moving said vehicle over the ground the uppermost ends of said conveyors being elevated a sufficient distance to discharge material directly therefrom into the load receiving body of a motor truck adapted to run alongside said vehicle.

2. In a construction as defined in claim 1, said classifier comprising a screen slightly inclined to the horizontal, and said vehicle comprising a bowl of which a portion of one of said conveyors forms a portion of its bottom extending rearwardly from said blade and said bowl having a rear end portion terminating at its lower end adjacent the said conveyor.

3. A device of the character described comprising a vehicle provided with ground wheels supporting the same for movement over the ground in one direction; said vehicle including a main body in the form of a bowl having an open forward side relative to said direction, a rear wall and opposed lateral side walls; a horizontally disposed stationary cutting blade extending between said lateral side walls adjacent their forward edges adapted to cut earth from the ground as said vehicle is moved in said direction; a screen positioned adjacent the rear edge of said blade positioned to receive material cut by said blade substantially directly therefrom; said screen being inclined in a direction transversely of the path of movement of said vehicle for movement of coarse material on said screen over its lowered edge adjacent one of said lateral side walls; an elongated conveyor extending transversely of said path of movement of said vehicle one end portion of which extends horizontally between said lateral side walls adjacent their lower edges and below said screen forming the bottom of said bowl, and the remainder of which conveyor extends upwardly and laterally outwardly of said vehicle to one side of the path of movement of said vehicle and of said cutting blade whereby material passing through said screen will be carried on said conveyer to its elevated end for discharge therefrom when said conveyor is actuated; a longitudinally inclined, elongated, second conveyor on said vehicle having its lower end positioned below the lower edge of said screen to receive coarse material from said screen passing over said edge; said second conveyor extending laterally outwardly of said path of movement of said vehicle and of said blade for discharge of said coarse material from the elevated end thereof at a point spaced laterally outwardly of the path of said blade and of said vehicle; means for actuating said conveyors for conveying material thereon to their elevated ends.

JOHN P. HOLLAND, Jr.